US009538078B2

United States Patent
Mehta et al.

(10) Patent No.: US 9,538,078 B2
(45) Date of Patent: Jan. 3, 2017

(54) USER INTERFACE FOR WIDE ANGLE PHOTOGRAPHY

(71) Applicant: Google Inc., Mountain View, CA (US)

(72) Inventors: Nirav Bipinchandra Mehta, Sunnyvale, CA (US); Mikkel Crone Köser, Mountain View, CA (US); David Singleton, Mountain View, CA (US); Robert William Hamilton, San Francisco, CA (US); Henry John Holland, Mountain View, CA (US); Tony Ferreira, Mountain View, CA (US); Thomas Weedon Hume, Mountain View, CA (US)

(73) Assignee: Google Inc., Mountain View, CA (US)

( * ) Notice: Subject to any disclaimer, the term of this patent is extended or adjusted under 35 U.S.C. 154(b) by 349 days.

(21) Appl. No.: 14/194,802

(22) Filed: Mar. 2, 2014

(65) Prior Publication Data

US 2015/0249785 A1   Sep. 3, 2015

(51) Int. Cl.
| | |
|---|---|
| *H04N 7/00* | (2011.01) |
| *H04N 5/232* | (2006.01) |
| *H04N 5/262* | (2006.01) |
| *G06F 3/01* | (2006.01) |
| *G06F 3/0484* | (2013.01) |

(52) U.S. Cl.
CPC ......... *H04N 5/23238* (2013.01); *G06F 3/017* (2013.01); *G06F 3/0484* (2013.01); *H04N 5/23293* (2013.01); *H04N 5/2628* (2013.01)

(58) Field of Classification Search
IPC .................................................. H04N 5/23216
See application file for complete search history.

(56) References Cited

U.S. PATENT DOCUMENTS

| | | | |
|---|---|---|---|
| 7,042,499 B1 * | 5/2006 | Kido ................... | H04N 1/00204 348/208.16 |
| 2010/0309147 A1 * | 12/2010 | Fleizach ............. | G06F 3/04883 345/173 |
| 2012/0236173 A1 * | 9/2012 | Telek ..................... | G03B 17/08 348/223.1 |

* cited by examiner

*Primary Examiner* — Tracy Y Li
(74) *Attorney, Agent, or Firm* — Troutman Sanders LLP; James E. Schutz; Andrew C. Doherty (57) ABSTRACT

The disclosed technology includes switching between a normal or standard-lens UI and a panoramic or wide-angle photography UI responsive to a zoom gesture. In one implementation, a user gesture corresponding to a "zoom-out" command, when received at a mobile computing device associated with a minimum zoom state, may trigger a switch from a standard lens photo capture UI to a wide-angle photography UI. In another implementation, a user gesture corresponding to a "zoom-in" command, when received at a mobile computing device associated with a nominal wide-angle state, may trigger a switch from a wide-angle photography UI to a standard lens photo capture UI.

20 Claims, 9 Drawing Sheets

USER INTERFACE FOR WIDE ANGLE PHOTOGRAPHY

BACKGROUND

As camera-equipped mobile computing devices (e.g., smartphones and tablets), increase in popularity, advances in software and hardware have enabled functionality on these devices traditionally reserved to conventional cameras and desktop computing devices. For example, many camera-equipped smartphones now come bundled with photo-capture software including wide-angle or panoramic photography capture modes. Moreover, many smartphone processors are now powerful enough to assemble multiple captured photos into a seamless composite image in a timely fashion.

As camera software on mobile computing devices evolves to include such features, it is important that updates to the user interface ("UI") of the software and mobile computing device maintain pace to ensure they are both usable and intuitive to discover. However, as many mobile computing devices feature a presence-sensitive display as a primary means of user input, traditional camera controls schemes relying on dedicated buttons and other physical widgets may not be feasible or wieldy on a mobile computing device.

SUMMARY

Some or all of the above needs may be addressed by certain implementations of the disclosed technology. Certain implementations include switching between a standard-lens photo capture UI and a wide-angle photo capture UI responsive to receipt of a predetermined input gesture. For example, a user gesture corresponding to a "zoom-out" command, when received at a mobile computing device associated with a minimum zoom (i.e., a maximum zoomed-out) state, may trigger a switch from a standard-lens photo capture UI to a wide-angle photo capture UI. In another implementation, a user gesture corresponding to a "zoom-in" command, when received at a mobile computing device associated with a nominal wide-angle state, may trigger a switch from a wide-angle photo capture UI to a standard-lens photo capture UI. Accordingly, implementations of the disclosed technology may improve the usability of camera-equipped mobile computing devices.

According to an example implementation, a method is provided. The method may include outputting for display, a standard-lens capture interface. The standard-lens capture interface may be based on a first focal length equal to or longer than a minimum focal length associated with an image capture device. The standard-lens capture interface may comprise a live preview associated with the image capture device. The method may further include receiving an indication of a user gesture. The user gesture may correspond to a zoom-out command. The method may yet further include, responsive to receiving the indication of the user gesture, outputting for display, a wide-angle capture interface. The wide-angle capture interface may be based on a second focal length shorter than the minimum focal length associated with the image capture device, and comprising the live preview.

According to another example implementation, a computer readable medium is provided. The computer readable medium may store instructions that, when executed by at least one processor in a system, cause the processor to perform the above method.

According to yet another example implementation, a system is provided. The system may include a memory operatively coupled to a processor and configured for storing data and instructions that may be executed by the processor to perform the above method.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Implementations of the disclosed technology include switching between a standard-lens photo capture UI and a wide-angle photo capture UI responsive to receipt of a predetermined input gesture. In an example implementation, a user gesture corresponding to a "zoom-out" command, when received at a mobile computing device associated with a minimum zoom (i.e., a maximum zoomed-out) state, may trigger a switch from a standard-lens photo capture UI to a wide-angle photo capture UI. In another implementation, a user gesture corresponding to a "zoom-in" command, when received at a mobile computing device associated with a nominal wide-angle state, may trigger a switch from a wide-angle photo capture UI to a standard-lens photo capture UI.

Throughout this disclosure, certain implementations are described by way of example in relation to switching photography UIs associated with a mobile computing device responsive to zoom gestures received at a presence-sensitive display. However, implementations of the disclosed technology are not so limited, and may be used with zoom, and other gestures/inputs, on non-mobile computing devices, conventional cameras, and cursor-based input devices.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

A presence-sensitive input device as discussed herein, may be a device that accepts input by the proximity of a finger, a stylus, or an object near the device. A presence-sensitive input device may also be a radio receiver (for example, a WiFi receiver) and processor which is able to infer proximity changes via measurements of signal strength, signal frequency shifts, signal to noise ratio, data error rates, and other changes in signal characteristics. A presence-sensitive input device may also detect changes in an electric, magnetic, or gravity field.

A presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display may have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as a personal digital assistant (PDA), satellite navigation devices, mobile phones, and video games. Further, such displays may include a capture device and a display.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums may be utilized for switching between a standard-lens photo capture UI and a wide-angle photo capture UI responsive to receipt of a predetermined input gesture, and will now be described with reference to the accompanying figures.

Figure 1:
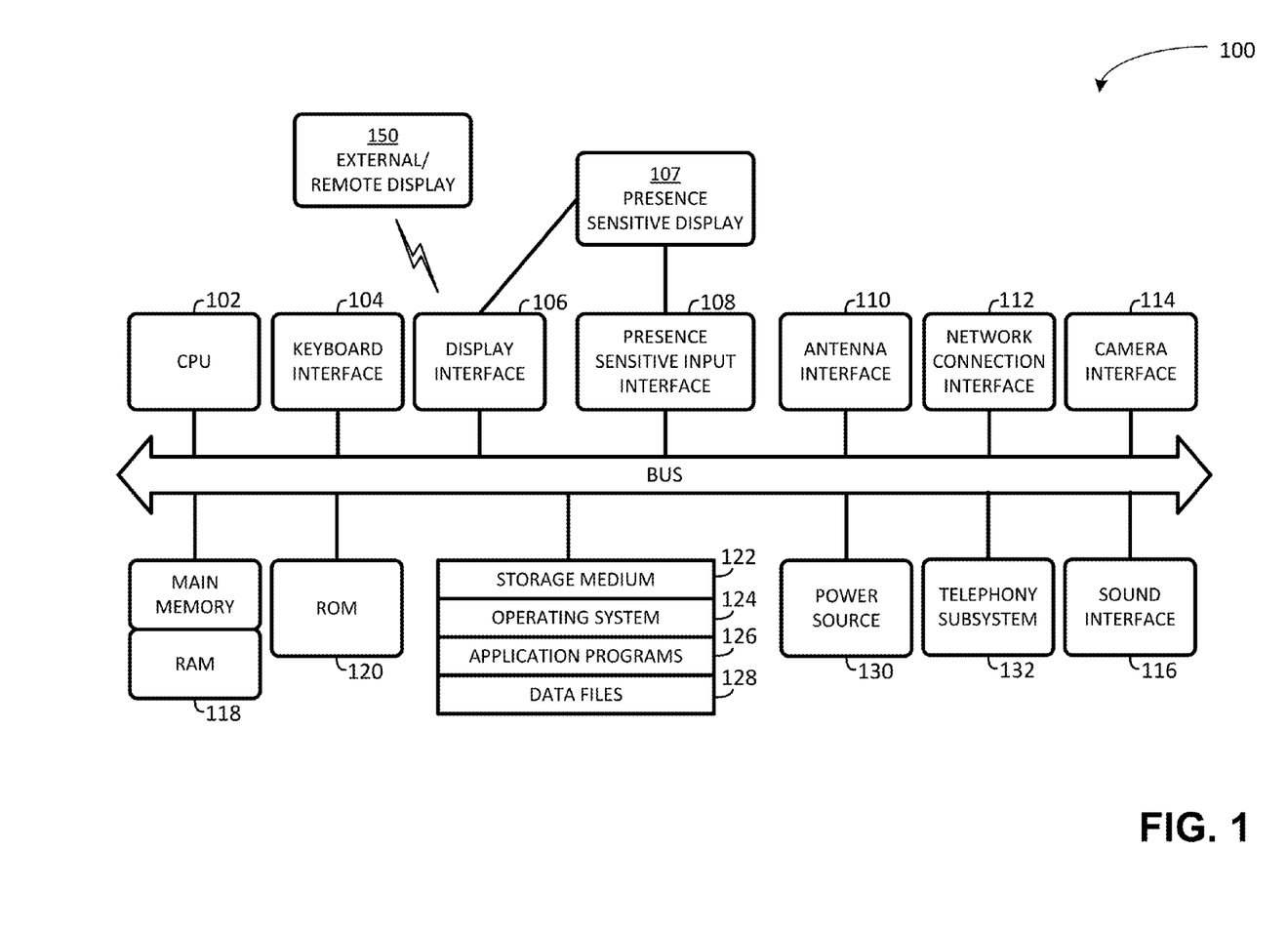
FIG. 1 depicts a block diagram of an illustrative computing device architecture 100, according to an example implementation.
Figure 2:
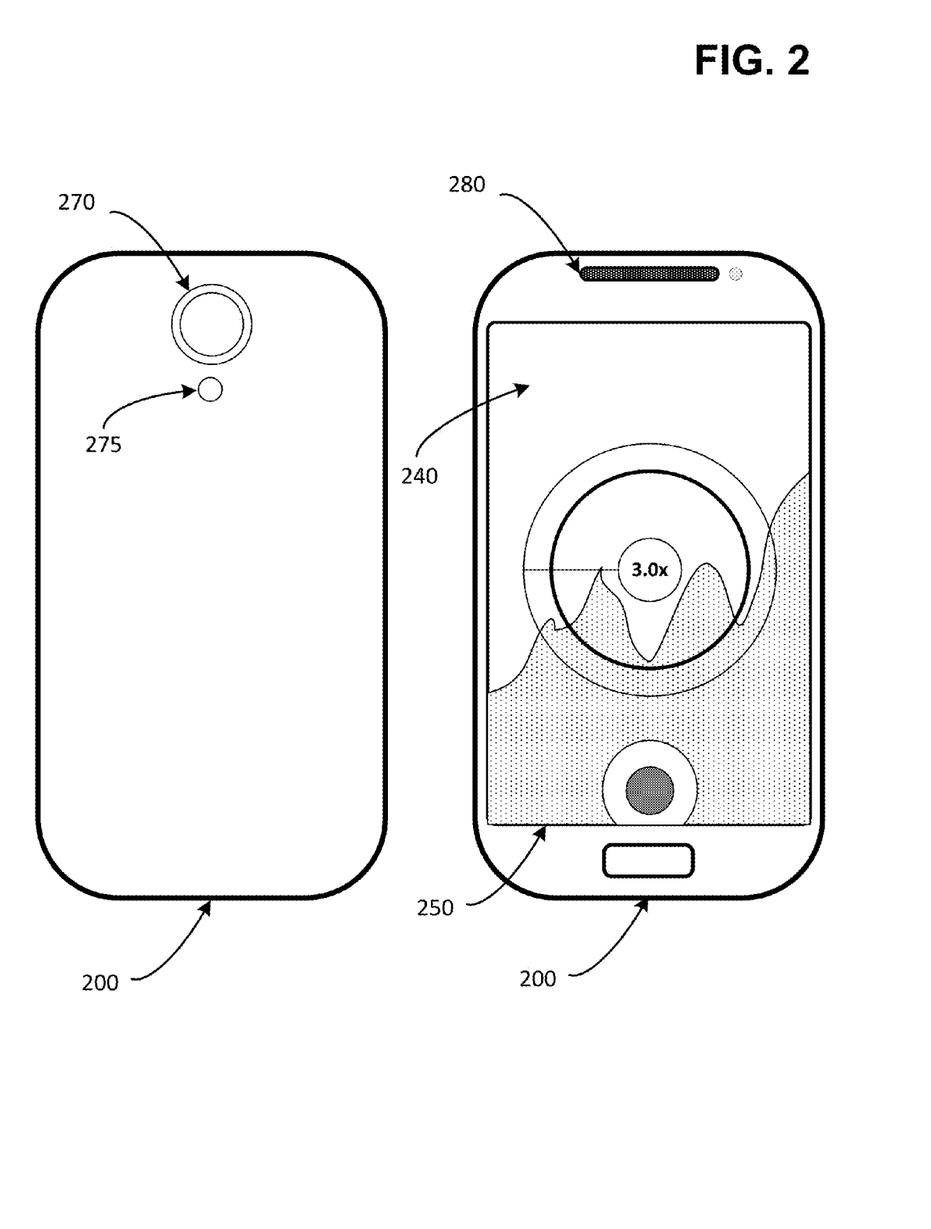
FIG. 2 depicts an illustration of a computing device 200, according to an example implementation.

FIG. 1 depicts a block diagram of an illustrative computing device architecture 100, according to an example implementation. Certain aspects of FIG. 1 may be embodied in a computing device 200 (for example, a mobile computing device as shown in FIG. 2). As desired, embodiments of the disclosed technology may include a computing device with more or less of the components illustrated in FIG. 1. It will be understood that the computing device architecture 100 is provided for example purposes only and does not limit the scope of the various embodiments of the present disclosed systems, methods, and computer-readable mediums.

The computing device architecture 100 of FIG. 1 includes a CPU 102, where computer instructions are processed; a display interface 106 that acts as a communication interface and provides functions for rendering video, graphics, images, and texts on the display. According to certain some embodiments of the disclosed technology, the display interface 106 may be directly connected to a local display, such as a touch-screen display associated with a mobile computing device. In another example embodiment, the display interface 106 may be configured for providing data, images, and other information for an external/remote display that is not necessarily physically connected to the mobile computing device. For example, a desktop monitor may be utilized for mirroring graphics and other information that is presented on a mobile computing device. According to certain some embodiments, the display interface 106 may wirelessly communicate, for example, via a Wi-Fi channel or other available network connection interface 112 to the external/remote display.

In an example embodiment, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof The computing device architecture 100 may include a keyboard interface 104 that provides a communication interface to a keyboard. In one example embodiment, the computing device architecture 100 may include a presence-sensitive display interface 107 for connecting to a presence-sensitive display. According to certain some embodiments of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 104, the display interface 106, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example embodiments of the computing device architecture 100 may include an antenna interface 110 that provides a communication interface to an antenna; a network connection interface 112 that provides a communication interface to a network. According to certain embodiments, a camera interface 114 is provided that acts as a communication interface and provides functions for capturing digital images from a camera. According to certain embodiments, a sound interface 116 is provided as a communication interface for converting sound into electrical signals using a microphone and for converting electrical signals into sound using a speaker. According to example embodiments, a random access memory (RAM) 118 is provided, where computer instructions and data may be stored in a volatile memory device for processing by the CPU 102.

According to an example embodiment, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example embodiment, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example embodiment, the computing device architecture 100 includes a power source 130 that provides an appropriate alternating current (AC) or direct current (DC) to power components. According to an example embodiment, the computing device architecture 100 includes a telephony subsystem 132 that allows the device 100 to transmit and receive sound over a telephone network. The constituent devices and the CPU 102 communicate with each other over a bus 134.

According to an example embodiment, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example embodiment, the term computing device, as used herein, may be a CPU, or conceptualized as a CPU (for example, the CPU 102 of FIG. 1). In this example embodiment, the computing device may be coupled, connected, and/or in communication with one or more peripheral devices, such as display. In another example embodiment, the term computing device, as used herein, may refer to a mobile computing device 200, such as a smartphone or tablet computer. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the computing device 200 may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

FIG. 2 depicts an illustration of a computing device 200, according to an example implementation. As shown in FIG. 2, the computing device may be a mobile computing device, for example, a smartphone or a tablet. The mobile computing device may have a built-in or integrated display 250 for presenting a graphical user interface (GUI) or other UI. The display may be combined with a presence sensitive input device to form a touch-sensitive or presence-sensitive display for receiving user input from a stylus, finger, or other means of gesture input. In some implementations, the mobile computing device may also include or be associated with a sound producing device 280, such as a speaker, piezoelectric buzzer, or the like.

According to certain implementations, the mobile computing device 200 may include one or more antennas or radios for wireless communication. These may include antennas for receiving GPS, Wi-Fi, or other radio communications. In addition, the mobile computing device may include one or more sensors for detecting, for example, temperature, pressure, altitude, magnetic heading, etc.

According to certain implementations, the mobile computing device 200 may be in communication with an image capture device 270. As shown in FIG. 2, the computing device may include a built-in or internal image capture device, for example, a camera or CCD. The image capture device may include or be associated with an illumination device 275, for example, a flash device or IR beacon. In another example implementation, the image capture device may be external to the computing device and in communication with the computing device, for example, through a direct connection, or wireless coupling.

In some implementations, the image capture device 270 may be associated with a single or fixed focal length, or multiple focal lengths, based on a type of lens or lens assembly associated with the image capture device. For example, a normal/standard lens or a wide-angle lens may provide a fixed focal length, while a zoom lens may provide a variable focal length. As used herein, an "image capture device" may refer simply to a camera with a default/fixed lens, or also to said camera with an additional or interchangeable lens or lens assembly used in conjunction with a main camera body. Accordingly, a "focal length" associated with an image capture device may refer to a focal length of the camera with or without such modification.

In photography or cinematography, a wide-angle lens may refer to a lens whose focal length is substantially smaller than the focal length of a normal lens for a given film plane. This type of lens may allow more of the scene to be included in the photograph, which may be useful in architectural, interior and landscape photography where the photographer may not be able to move farther from the scene to photograph it. Similar to wide-angle photography, panoramic photography may refer generally to images showing a field of view approximating, or greater than, that of the human eye.

Although many camera-equipped mobile computing devices incorporate a non-removable normal or standard lens, with a fixed focal length, a wide-angle or panoramic photograph may be simulated combining multiple photographs from a normal lens. Thus, a user may simulate "zooming-out" beyond a minimum zoom level associated with an image capture device. In another vein, a larger focal length than normal, or "zoom-in" effect, may be simulated by digitally magnifying an area of a captured image.

Conventional camera interfaces typically enable a user to adjust a zoom level or focal length associated with an image capture device by using a pair of complimentary gestures or actions. For example, on many camera-equipped mobile computing devices with presence-sensitive displays, a user may zoom in and zoom out by performing pinch-in and pinch-out gestures, respectively. On commodity or entry-level digital cameras, zoom is often controlled by manipulating a rocker or toggle switch. On DSLRs and other higher-end cameras, zooming may be achieved by rotating a zoom ring or other control commonly circumscribing a lens housing.

With conventional technology, zooming out from a standard-lens capture mode may only be possible to the fixed or minimum focal length of the associated image capture device. Thus, continuing a user gesture for zooming out, while already maximally zoomed out may not provide further change in a level zoom or focal length.

However, upon recognizing that a wide-angle or panoramic photograph may reflect a zoom level or focal length beyond the fixed or minimum focal length of an image capture device, it makes intuitive sense to enable a user to continue zooming out from a standard-lens capture mode to reach a wide-angle capture mode; and vice versa with zooming in. Moreover, as a user may inadvertently over or under zoom, the switching mechanism may be user discoverable without entering an unrecoverable state or violating the intuitive zoom paradigm just described.

Accordingly, as described herein, certain implementations of the disclosed technology include switching between a standard-lens photo capture UI and a wide-angle photo capture UI responsive to receipt of a predetermined input gesture.

According to certain implementations, image capture software running at least partially at a computing device 200 may be configured to capture normal- or standard-lens photography in a first mode and panoramic or wide-angle photography in a second mode. In some implementations, the standard-lens mode or a separate zoom mode may also enable the capture of zoomed-in images. Each capture mode may be associated with a specialized UI.

Figure 3:
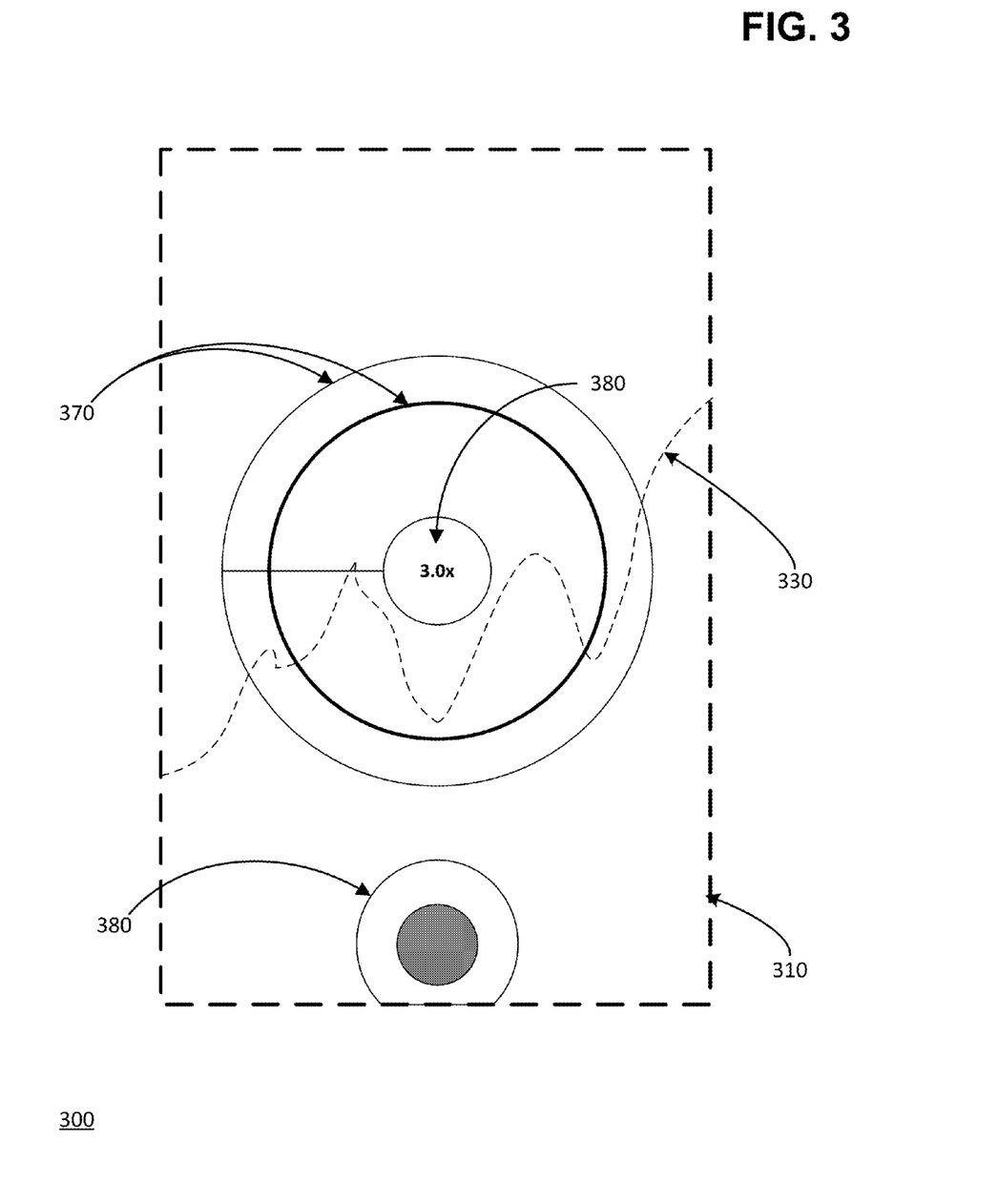
FIG. 3 depicts an illustration of a standard-lens capture UI 300, according to an example implementation.

FIG. 3 depicts an illustration of a standard-lens capture UI 300, according to an example implementation. As shown in FIG. 3, the standard-lens capture UI 300 may include an indication of a zoom level 380 or current focal length associated with an image capture device 270. In some implementations, instead of or in addition to a numerical indication of the zoom level 380, the UI 300 may include a visual representation, such as a relative position between concentric circles 370. The standard-lens capture UI may also include a live preview 310 associated with the current zoom level or focal length, and a button 380 or other UI element for initiating capture of an image represented by the live preview. In some implementations, the live preview may substantially span the entire standard-lens capture UI or only a portion of the UI 300. For illustrative purposes, the live previews as shown throughout the figures reflect a mountain landscape 330 in view of the associated image capture device 275.

Figure 4:
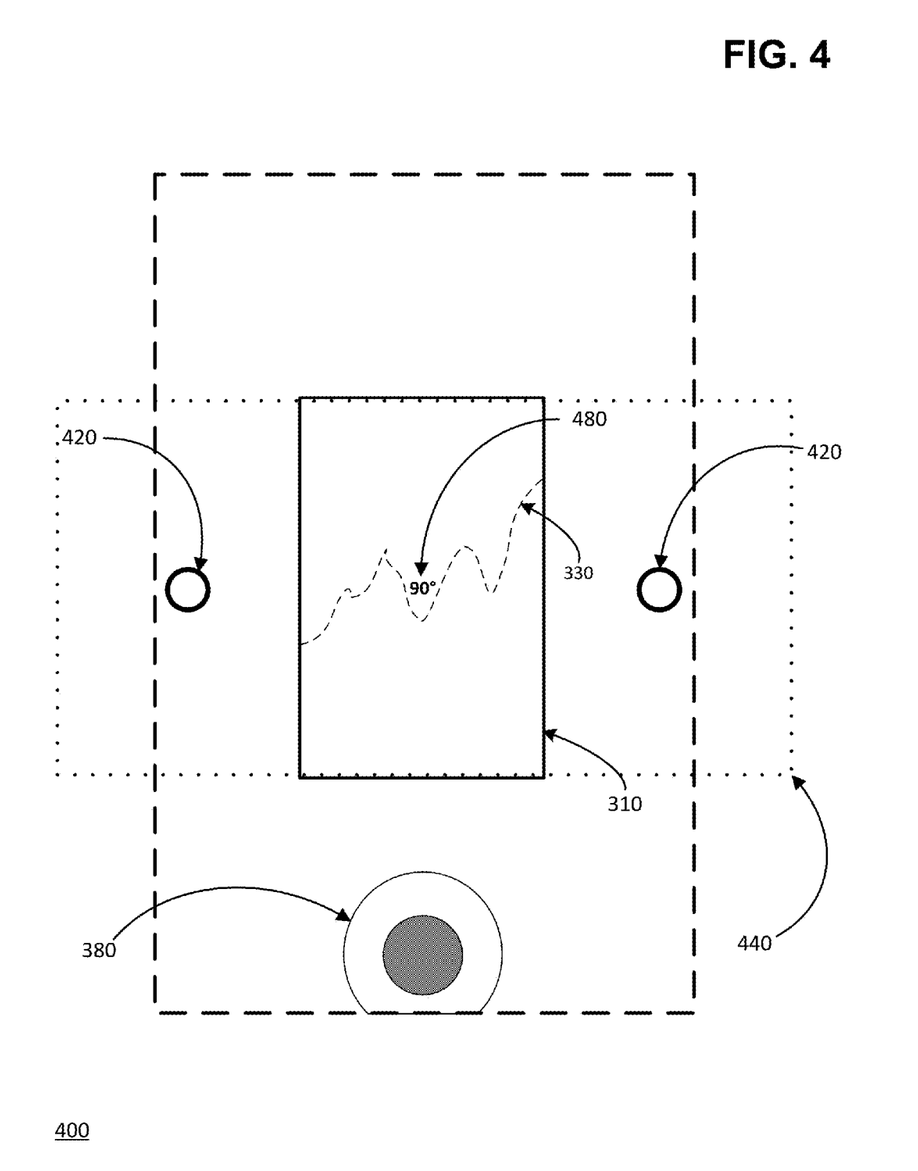
FIG. 4 depicts an illustration of a wide-angle capture UI 400, according to an example implementation.

FIG. 4 depicts an illustration of a wide-angle capture UI 400, according to an example implementation. The wide-angle capture UI may include an indication of a zoom level or focal length. In wide-angle capture mode, the indication of zoom level may be less than 100% or negative. Similarly, an indicated focal length may be shorter than a minimum or fixed focal length associated with the image capture device. As shown in FIG. 4, the wide-angle capture UI may also include an indication of a target angle of view 480 for creating a desired composite photograph.

In some implementations, a wide-angle capture mode may be associated with a nominal wide-angle of view (and corresponding maximum focal length), beyond which the wide-angle capture UI 400 offers little to no benefit over the standard-lens capture UI 300. In an example implementation, the nominal wide-angle and maximum focal length of the wide-angle capture mode may correspond to a minimum focal length of the standard-lens capture mode. Accordingly, this state may indicate as a bidirectional transition point between UIs. In another implementation, the nominal wide-angle may be a minimum angle of view (and corresponding focal length) determined to be useful for wide-angle photography, for example, 60°.

The wide-angle capture UI 400 may also include live preview 310. However, as the live-preview may be associated with a longer focal length than the current focal length of the wide-angle capture UI, the live preview may be smaller than when displayed in the standard-lens capture UI 300, and may not span the wide-angle capture UI.

Although not necessarily displayed to a user as part of the wide-angle capture UI 400, bounding box 440 may represent an indication of a target area to fill with captured images in order to create a composite image with a desired field of view.

The wide-angle capture UI 400 may also include a button 380 or other UI element for initiating capture of an image represented by the live preview. However, as described later herein, an image may be automatically captured by the image capture device responsive to alignment on the display 250 of the live preview with targets representing suggested images to capture 420. Moreover, in some implementations, the wide-angle capture UI may also include representations of one or more previously captured images.

According to certain implementations, a mobile computing device 200 may transition between UIs 300 and 400 responsive to receiving a zoom user gesture. For example, in one scenario, a user of a mobile computing device 200 presenting a standard-lens capture UI 300, may wish to return from a current zoom level, e.g., "3.0x", as shown in FIG. 3, 380, to a nominal or minimum zoom level, e.g., "1.0x". The user may perform a pinch-out gesture at the presence-sensitive display 250, with the zoom level changing concurrently with the span of the pinch-out gesture. If the zoom level reaches a nominal or minimum zoom level associated with the image capture device and the pinch-out gesture continues, the mobile computing device may, continuously, or without noticeable delay, switch to wide-angle capture UI 400 and continue to zoom out as the pinch-out gesture expands.

According to certain implementations, various techniques may be used to confirm a user's intent to switch between UIs 300 and 400. In some implementations, a user gesture may only initiate a UI change if the user gesture begins when the zoom level is already within a predetermined range of a nominal or minimum zoom level. Thus, for a user at the standard-lens capture UI and zoom level "3.0x", to trigger a change to the wide-angle capture UI 400, the user may have to perform a first pinch-out gesture to reach a nominal or minimum zoom level, e.g., "1.0x", and a second pinch-out gesture to transition to the wide-angle capture UI 400.

In another implementation, once a nominal or minimum zoom level is reach responsive to a user gesture, the user gesture may be required to continue to expand beyond a predetermined threshold or persist for a predetermined period before the change between UI is triggered. This requirement may manifest in a perceived pause or delay, during which the user may end the user gesture without triggering a switch between UIs.

For example, in one scenario, a user of a mobile computing device 200 presenting a wide-angle capture UI 400 configured to capture a 90° wide-angle shot, as shown in FIG. 4, may wish to return to capturing standard-lens photography. The user may perform a pinch-in gesture at the presence sensitive display 250, causing the interface to zoom in, the live preview 310 to expand, and the indicated angle of view 480 to decrease, until a nominal wide-angle or minimum zoom level is reached. Two-hundred milliseconds later, as the user sustains the pinch-in gesture, the mobile computing device may transition to a standard-lens capture UI 300.

According to certain implementations, the aforementioned threshold of time or distance may be user adjustable, or adjusted automatically by the mobile computing device 200 to reduce inadvertent switching of UIs. In some implementations, a switch between may be determined to be inadvertent if a user switches from a standard-lens capture UI 300 to a wide-angle capture UI 400, and then switches back or exits the camera software altogether within a predetermined period. In another implementation, the determining may also be based on whether or not a user captures a photograph after transitioning between UIs.

In yet another implementation, the computing device 200 may prompt a user for confirmation to switch between UIs, for example via a dialog box or the like, responsive to receiving an indication of the user gesture.

Figure 5:
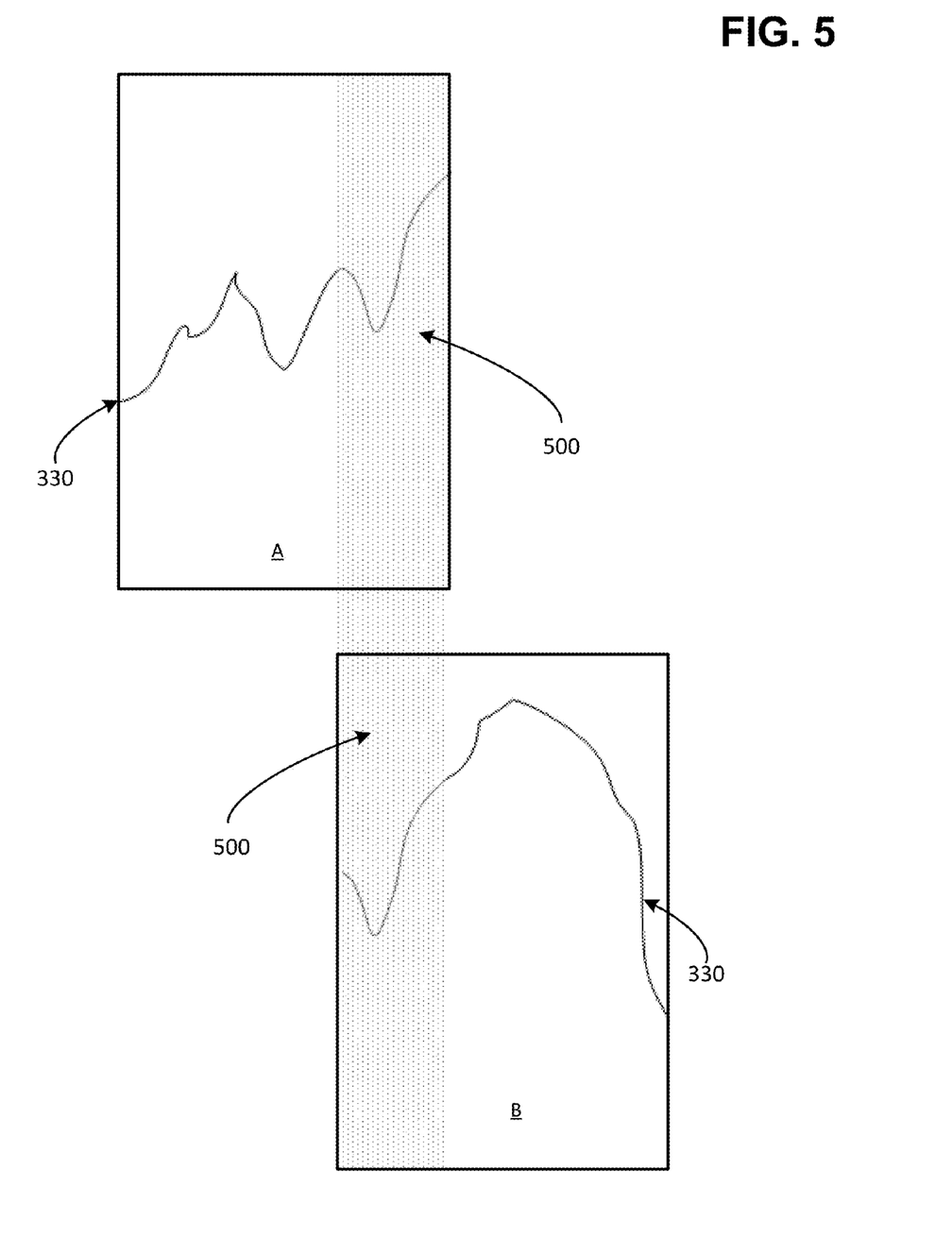
FIG. 5 depicts an illustration of determined overlap 500 between two previously captured images A and B, according to an example implementation.

According to certain implementations, the computing device 200 may prompt the user to switch between UIs based on analyzing previously captured images. For example, in some implementations, it may be determined that two previously captured images comprise contiguous image content, or "overlap," by a predetermined amount. FIG. 5 depicts an illustration of determined overlap 500 between two previously captured images A and B, according to an example implementation. Techniques for determining overlap between pictures are known in the art and not discussed at length herein.

An amount of determined overlap within a certain range may indicate a manual user-attempt to capture photographs suitable for composition into a panorama or wide-angle image. Accordingly, in some implementations, the computing device 200 may prompt the user to enter a wide-angle capture mode in order to capture additional overlapping images, responsive to such a determination. In an example implementation, a zoom gesture may be performed by a user in response to the prompt to confirm entry into the wide-angle capture mode.

Figure 6:
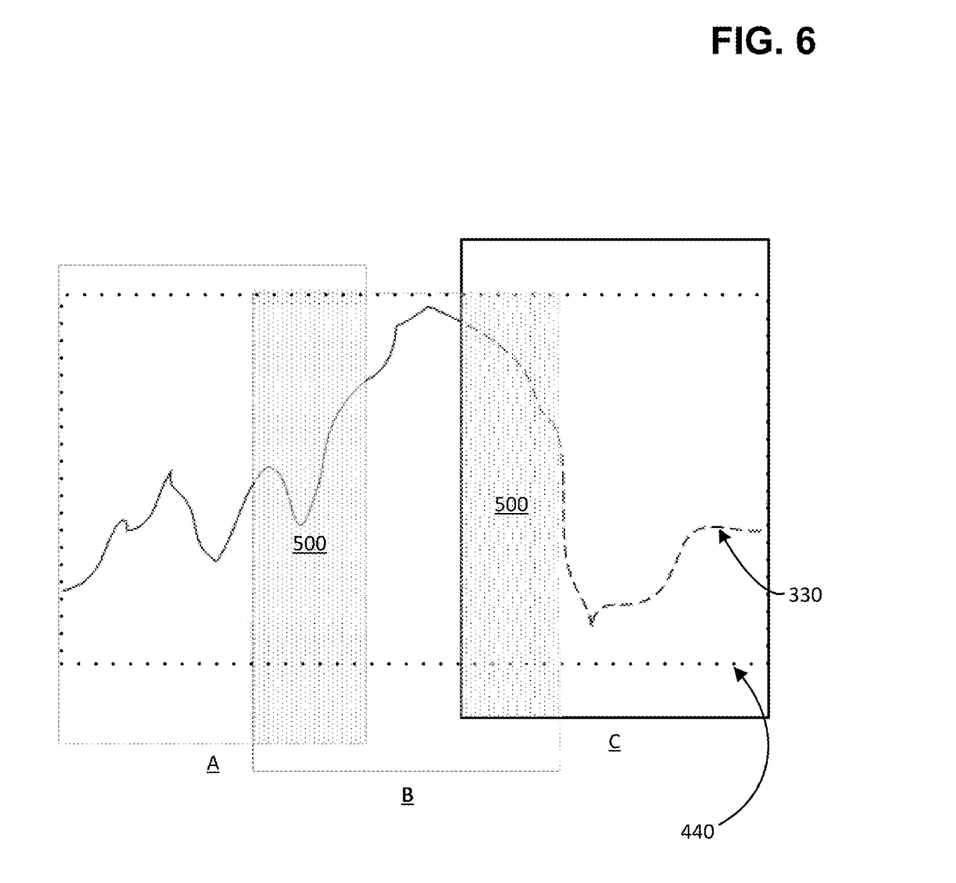
FIG. 6 depicts an illustration of a live preview representing a suggested third image C to capture based on overlap 500 with previously captured images A and B, according to an example implementation.
Figure 7:
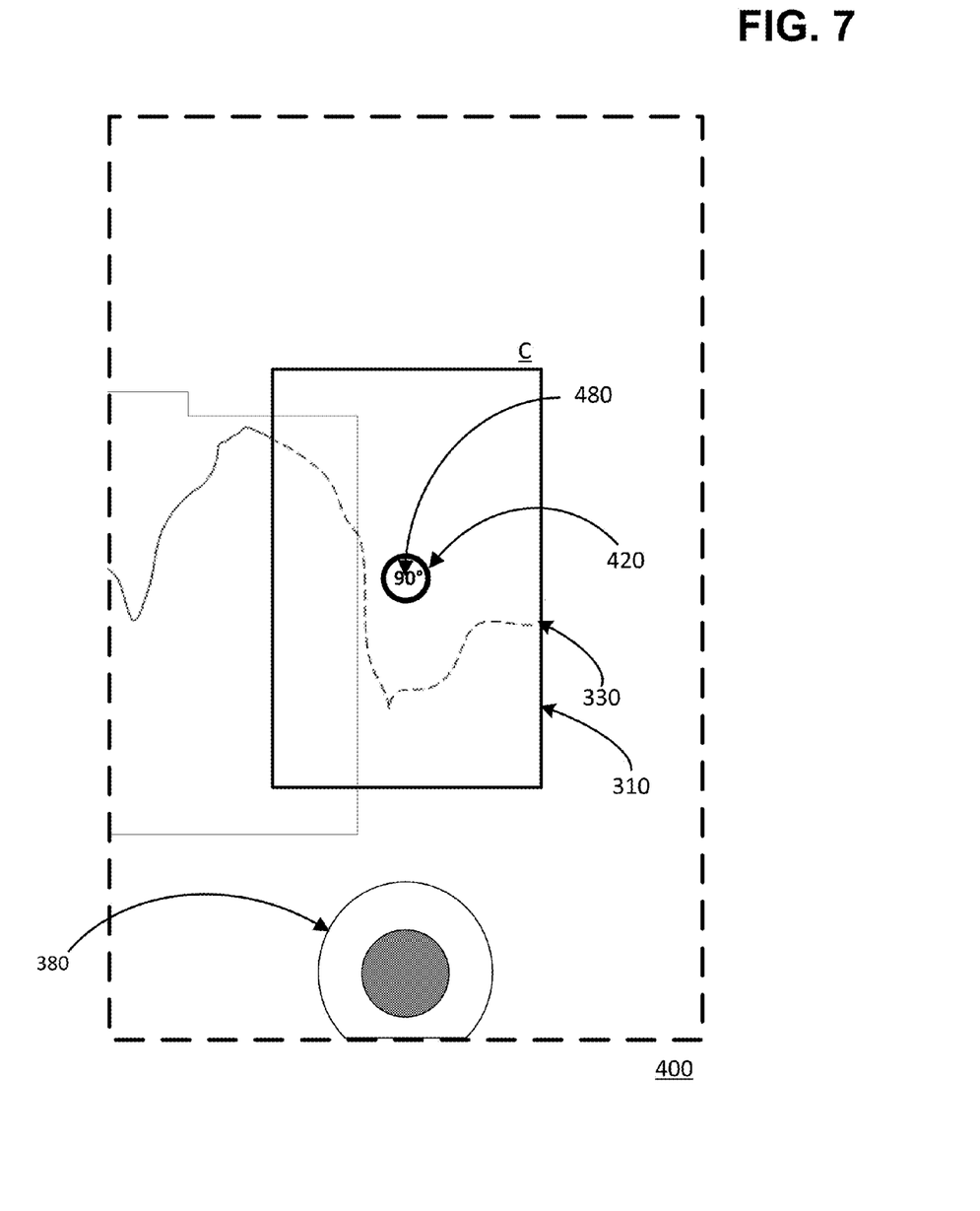
FIG. 7 depicts an illustration of a wide-angle capture UI 400 with representations of previously captured images A and B, and a live preview representing image C, according to an example implementation.

FIG. 6 depicts an illustration of a live preview representing a suggested third image C to capture based on overlap 500 with previously captured images A and B, according to an example implementation. In some implementations, the mobile computing device 200 may suggest one or more additional images to capture to aid composition of an image with a desired field of view, as illustrated by bounding box 440. Accordingly, the wide-angle capture UI 400 may include one or more graphical targets 420 corresponding to suggested images to capture, as shown in FIG. 4. Aligning live preview 310 with such a target and triggering an image capture by button 380 may result in capture of an image with suitable overlap for composition.

In some implementations, the computing device 200 automatically may trigger the image capture device 270 to capture an image when alignment within a predetermined threshold is detected between a target 420 and a center of the live preview 310. Thus, triggering of button 380 may not be necessary to create a wide-angle image.

Figure 8:
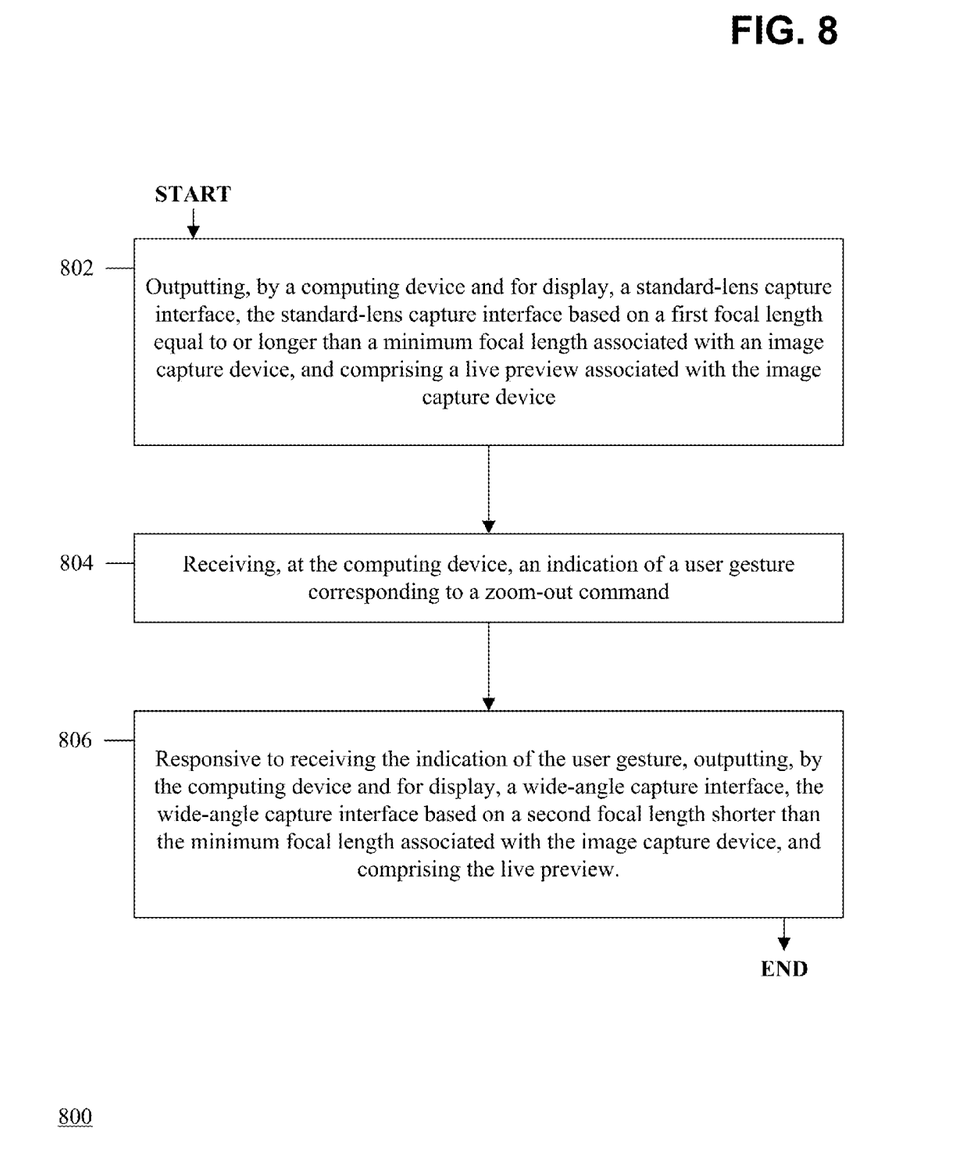
FIG. 8 is a flow diagram of a method 800 for switching to a wide-angle capture UI 400 from a standard-lens capture UI 300, according to an example implementation.

FIG. 8 is a flow diagram of a method 800 for switching to a wide-angle capture UI 400 from a standard-lens capture UI 300, according to an example implementation. As shown in FIG. 8, the method 800 starts in block 802, and, according to an example implementation, includes outputting, by a computing device and for display, a standard-lens capture interface, the standard-lens capture interface based on a first focal length equal to or longer than a minimum focal length associated with an image capture device, and comprising a live preview associated with the image capture device. In block 804, the method 800 includes receiving, at the computing device, an indication of a user gesture corresponding to a zoom-out command. In block 806, the method 800 includes, responsive to receiving the indication of the user gesture, outputting, by the computing device and for display, a wide-angle capture interface, the wide-angle capture interface based on a second focal length shorter than the minimum focal length associated with the image capture device, and comprising the live preview.

Figure 9:
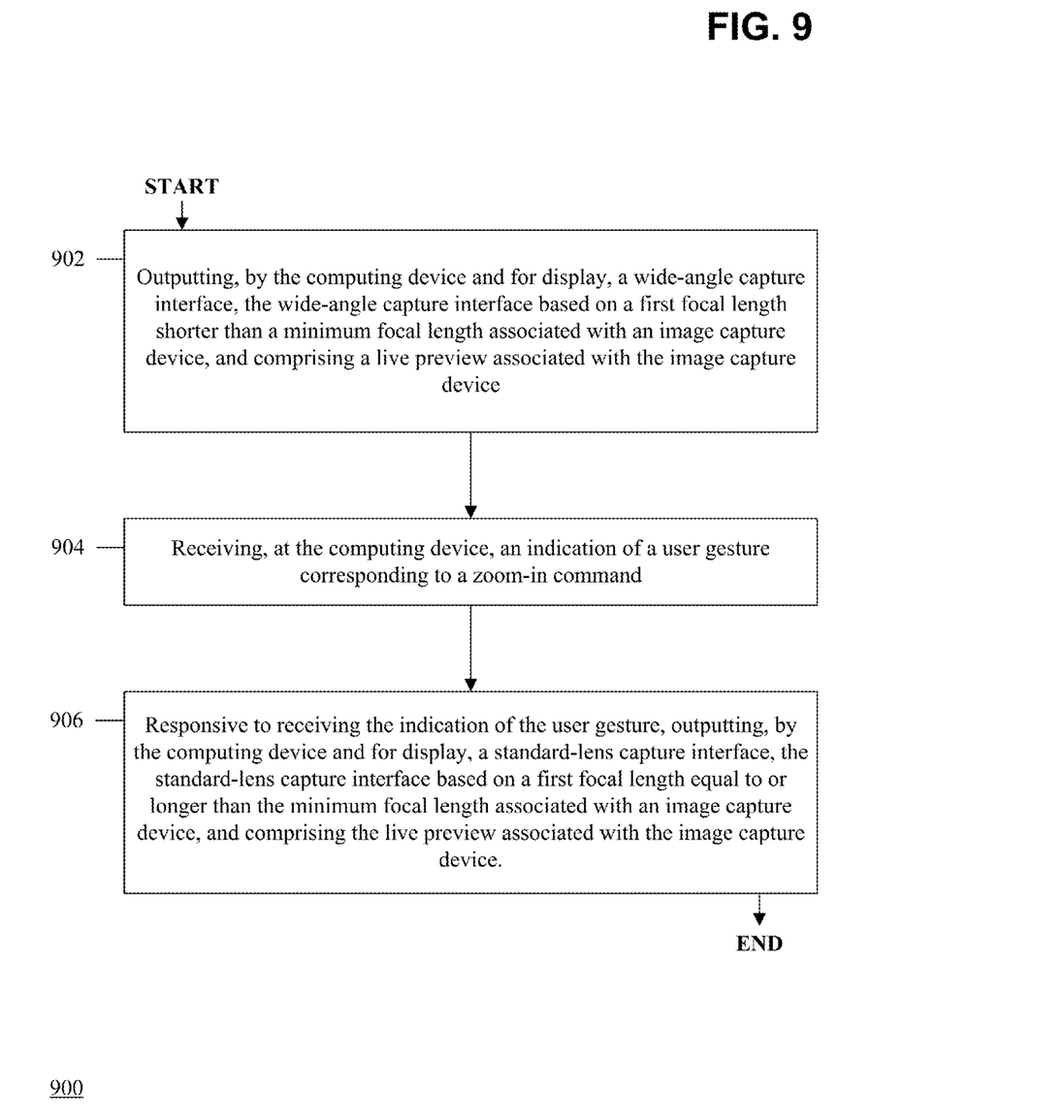
FIG. 9 is a flow diagram of a method 900 for switching to a standard-lens capture UI 300 from a wide-angle capture UI 400, according to an example implementation.

FIG. 9 is a flow diagram of a method 900 for switching to a standard-lens capture UI 300 from a wide-angle capture UI 400, according to an example implementation. As shown in FIG. 9, the method 900 starts in block 902, and, according to an example implementation, includes outputting, by the computing device and for display, a wide-angle capture interface, the wide-angle capture interface based on a first focal length shorter than a minimum focal length associated with an image capture device, and comprising a live preview associated with the image capture device. In block 904, the method 900 includes receiving, at the computing device, an indication of a user gesture corresponding to a zoom-in command. In block 906, the method 900 includes, responsive to receiving the indication of the user gesture, outputting, by the computing device and for display, a standard-lens capture interface, the standard-lens capture interface based on a first focal length equal to or longer than the minimum focal length associated with an image capture device, and comprising the live preview associated with the image capture device.

It will be understood that the various steps shown in FIGS. 8 and 9 are illustrative only, and that steps may be removed, other steps may be used, or the order of steps may be modified.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method comprising:
outputting, by a computing device and for display, a standard-lens capture interface, the standard-lens capture interface based on a first focal length equal to or longer than a minimum focal length associated with an image capture device, and comprising a live preview associated with the image capture device;
receiving, at the computing device, an indication of a user gesture corresponding to a zoom-out command; and
responsive to receiving the indication of the user gesture corresponding to the zoom-out command, outputting, by the computing device and for display, a wide-angle capture interface, the wide-angle capture interface based on a second focal length shorter than the minimum focal length associated with the image capture device, and comprising the live preview.

2. The method of claim 1, wherein the wide-angle capture interface further comprises one or more indications, in addition to the live preview, of additional images to be captured to generate a wide-angle image.

3. The method of claim 2, wherein a number of the one or more indications of additional images corresponds to the second focal length.

4. The method of claim 1, wherein the standard-lens capture interface further comprises an indication of the first focal length or an indication of a zoom level associated with the live preview.

5. The method of claim 1, wherein the wide-angle capture interface further comprises an indication of the second focal length or an angle of view associated with the second focal length.

6. The method of claim 1, wherein the indication of the user gesture is received while the first focal length is equal to the minimum focal length associated with the image capture device, the method further comprising changing a current focal length associated with the image capture device to the minimum focal length associated with the image capture device.

7. The method of claim 1, wherein the indication of the user gesture is received responsive to a user prompt offering to output the wide-angle capture interface, the method further comprising:
responsive to determining, by the computing device, that two or more consecutive images defined by the image capture device comprise contiguous image content, outputting, by the computing device, the user prompt.

8. The method of claim 7, wherein the two or more images defined by the image capture device are consecutively captured images.

9. The method of claim 7, wherein the wide-angle capture interface further comprises representations of the two or more images received from the image capture.

10. A computer program product comprising a non-transitory computer readable medium that stores instructions that, when executed by a computing device, cause the computing device to perform a method comprising:
outputting, by the computing device and for display, a standard-lens capture interface, the standard-lens capture interface based on a first focal length equal to or longer than a minimum focal length associated with an image capture device, and comprising a live preview associated with the image capture device;
receiving, at the computing device, an indication of a user gesture corresponding to a zoom-out command; and
responsive to receiving the indication of the user gesture corresponding to the zoom-out command, outputting, by the computing device and for display, a wide-angle capture interface, the wide-angle capture interface based on a second focal length shorter than the minimum focal length associated with the image capture device, and comprising the live preview and one or more indications, in addition to the live preview, of additional images to be captured to generate a wide-angle image.

11. The computer program product of claim 10, wherein a number of the one or more indications of additional images corresponds to the second focal length.

12. The computer program product of claim 10, wherein the wide-angle capture interface further comprises an indication of an angle of view associated with the second focal length.

13. The computer program product of claim 10, wherein the indication of the user gesture is received while the first focal length is within a predetermined threshold of the minimum focal length associated with the image capture device.

14. The computer program product of claim 10, wherein the indication of the user gesture is received responsive to a user prompt offering to output the wide-angle capture interface, the method further comprising:
responsive to determining, by the computing device, that two or more consecutive images defined by the image capture device comprise contiguous image content, outputting, by the computing device, the user prompt.

15. The computer program product of claim 14, wherein the wide-angle capture interface further comprises representations of the two or more images defined by the image capture device.

16. A system comprising:
at least one memory operatively coupled to a computing device and configured for storing data and instructions that, when executed by the computing device, cause the computing device to perform a method comprising:
outputting, by the computing device and for display, a wide-angle capture interface, the wide-angle capture interface based on a first focal length shorter than a minimum focal length associated with an image capture device, and comprising a live preview associated with the image capture device;
receiving, at the computing device, an indication of a user gesture corresponding to a zoom-in command; and
responsive to receiving the indication of the user gesture corresponding to the zoom-in command, outputting, by the computing device and for display, a standard-lens capture interface, the standard-lens capture interface based on a first focal length equal to or longer than the minimum focal length associated with an image capture device, and comprising the live preview associated with the image capture device.

17. The system of claim 16, the method further comprising the wide-angle capture interface further comprising one or more indications, in addition to the live preview, of additional images to be captured to generate a wide-angle image.

18. The system of claim 17, wherein a number of the one or more indications of additional images corresponds to the second focal length.

19. The system of claim 16, wherein the wide-angle capture interface further comprises an indication of an angle of view associated with the second focal length.

20. The system of claim 16, wherein the indication of the user gesture is received while the first focal length is within a predetermined threshold of the minimum focal length associated with the image capture device, the method further comprising changing a current focal length associated with the image capture device to a focal length within a predetermined threshold of the minimum focal length associated with the image capture device.

* * * * *